United States Patent
Moss

(10) Patent No.: US 8,624,513 B2
(45) Date of Patent: Jan. 7, 2014

(54) MULTICHANNEL LIGHTING UNIT AND DRIVER FOR SUPPLYING CURRENT TO LIGHT SOURCES IN MULTICHANNEL LIGHTING UNIT

(75) Inventor: Timothy Moss, Chicago, IL (US)

(73) Assignee: Koninklijke Philips N.V., Eindhoven (NL)

( * ) Notice: Subject to any disclaimer, the term of this patent is extended or adjusted under 35 U.S.C. 154(b) by 143 days.

(21) Appl. No.: 13/392,543

(22) PCT Filed: Aug. 18, 2010

(86) PCT No.: PCT/IB2010/053734
§ 371 (c)(1),
(2), (4) Date: Feb. 27, 2012

(87) PCT Pub. No.: WO2011/024102
PCT Pub. Date: Mar. 3, 2011

(65) Prior Publication Data
US 2012/0153834 A1   Jun. 21, 2012

Related U.S. Application Data

(60) Provisional application No. 61/236,569, filed on Aug. 25, 2009.

(51) Int. Cl.
*H05B 37/02* (2006.01)
(52) U.S. Cl.
USPC ............ 315/193; 315/294; 315/297; 315/212
(58) Field of Classification Search
USPC ...... 315/185 R, 192, 291, 294, 297, 307, 212
See application file for complete search history.

(56) References Cited

U.S. PATENT DOCUMENTS

| | | |
|---|---|---|
| 7,439,945 B1 | 10/2008 | Awalt et al. |
| 2007/0040514 A1 | 2/2007 | Pong et al. |
| 2007/0080652 A1 | 4/2007 | Elferich et al. |
| 2009/0134806 A1 | 5/2009 | Cauffield |
| 2012/0200229 A1* | 8/2012 | Kunst et al. ............ 315/186 |
| 2013/0057163 A1* | 3/2013 | Sutardja et al. ......... 315/185 R |
| 2013/0207556 A1* | 8/2013 | Grajcar, Zdenko ....... 315/186 |

FOREIGN PATENT DOCUMENTS

| | | |
|---|---|---|
| WO | 2007016373 A2 | 2/2007 |
| WO | 2007104146 A1 | 9/2007 |
| WO | 2009019634 A1 | 2/2009 |

OTHER PUBLICATIONS

Hu et al., "LED Driver with self-adaptive drive voltage", Nov. 2008, vol. 23, No. 6, pp. 3116-3125.

* cited by examiner

*Primary Examiner* — Don Le
(74) *Attorney, Agent, or Firm* — Yuliya Mathis

(57) ABSTRACT

A lighting unit includes at least two channels of light sources, and a driver for the light sources. The driver includes a DC/DC converter and a control arrangement for controlling the current supplied to at least one of the two channels in response to a control signal produced by the DC/DC converter. Beneficially, a feedback loop controls a switching device in the DC/DC converter to maintain the light level produced by the light sources at a desired level regardless of changes in the supply voltage and the load.

20 Claims, 5 Drawing Sheets

MULTICHANNEL LIGHTING UNIT AND DRIVER FOR SUPPLYING CURRENT TO LIGHT SOURCES IN MULTICHANNEL LIGHTING UNIT

TECHNICAL FIELD

The present invention is directed generally to a lighting unit and a driver for a lighting unit. More particularly, various inventive methods and apparatus disclosed herein relate to a lighting unit having a plurality of LED light sources and a driver for such a lighting unit.

BACKGROUND

Illumination devices based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature one or more lighting units, including one or more LEDs capable of producing different colors, e.g. red, green, and blue, as well as a processor for independently controlling the output of the LEDs in order to generate a variety of colors and color-changing lighting effects. These lighting units may employ two or more groups or "channels" of LEDs which produce light of different colors, each supplied with the proper current to enable generation and mixing of light to produce a desired lighting effect, for example, as discussed in detail in U.S. Pat. Nos. 6,016,038 and 6,211,626, incorporated herein by reference.

In some lighting units, the first channel may include a first plurality of white LEDs (e.g., four LEDs) in series with each other, and the second channel may include a second plurality of red LEDs (e.g., two LEDs) in series with each other. A desired color effect of the lighting unit may be controlled by adjusting the current through the two channels. In some lighting units the channels are connected in series so that a single stream or channel of current flows through all the LEDs, and a shunt is provided across selected LEDs (e.g., the LEDs of the second channel) to divert the current away from selected LEDs to yield the desired color effect.

Unfortunately, this arrangement typically entails a loss of energy and/or a complicated control scheme. For example, if the shunt is a linear shunt, it can result in additional unwanted power losses. A switching or pulse-width modulated (PWM) shunt can be employed, but the known arrangements require a complicated drive scheme.

Thus, there is a need in the art to provide a lighting unit with multiple LED channels which can be driven efficiently to achieve a desired lighting effect.

SUMMARY

The present disclosure is directed to a lighting unit and a driver for a lighting unit. For example, the present disclosure describes a lighting unit that includes at least two channels of light sources, and a driver for the light sources. The driver includes a DC/DC converter and a control arrangement for controlling the current supplied to at least one of the two channels in response to a control signal produced by the DC/DC converter. Beneficially, a feedback loop controls a switching device in the DC/DC converter to maintain the light level produced by the light sources at a desired level regardless of changes in the supply voltage and the load.

Generally, in one aspect, an apparatus includes: a first channel of first light emitting devices (LEDs) connected in series with each other; a second channel of second LEDs connected in series with each other; and a driver for driving the first and second channels of LEDs. At least one of the second LEDs has a different color or color temperature than at least one of the first LEDs. The driver includes: a flyback converter, a buck converter, a pulse width modulator, and a feedback device. The flyback converter is configured to receive a first DC voltage and to output a second DC voltage. The buck converter is configured to receive the second DC voltage and to generate an output voltage that causes a first current to flow through the first channel of LEDs and a second current to flow through the second channel of LEDs. The pulse width modulator is configured to control the second current flowing through the second channel of LEDs in response to a control signal. The control signal is produced from an inductor winding in one of the flyback converter and the buck converter. The feedback device is configured to sample at least one of the first current and the second current and in response thereto to control a switching operation of the buck converter.

In some embodiments, the first channel of LEDs is connected in series with the second channel of LEDs. The driver may include a temperature sensor configured to sense a temperature of at least one of the LEDs, and in response thereto to generate a feedback signal for adjusting the output voltage of the DC/DC converter. The driver may also include a light sensor configured to sense light produced by the LEDs, and in response thereto to generate a feedback signal for adjusting the output voltage of the DC/DC converter.

Generally, in another aspect, an apparatus includes a first group of light sources connected in series with each other, a second group of light sources connected in series with each other, and a driver for driving the first and second groups of light sources. At least one of the light sources of the second group has a different color or color temperature than at least one of the light sources of the first group. The driver includes a DC/DC converter and a control device. The DC/DC converter is configured to receive a first DC voltage and to output an output voltage. The output voltage causes a first current to flow through the first group of light sources and a second current to flow through the second group of light sources. The control device is configured to control the second current provided to the second group of light sources in response to a control signal. The DC/DC converter produces the control signal.

In some embodiments, the control device includes a pulse width modulator that controls the second current flowing through to the second group of light sources by shunting the second current across one or more of the second light sources in response to the control signal. Also, the second light sources may have a different color or color temperature than the first light sources.

In one embodiment, the DC/DC converter includes a flyback converter. The control signal for controlling the current flowing through the second group of light sources is produced by a winding of a transformer in the flyback converter. In another embodiment, the DC/DC converter includes a buck converter. The control signal for controlling the current flowing through the second group of light sources is produced by an inductor winding in the buck converter.

Further, the driver may include a feedback device configured to sample at least one of the first current and the second current and in response thereto to control a switching operation of the DC/DC converter. Additionally or alternatively, the driver may include a sensor sensing a temperature or a light emitted by at least one of the first and second light sources, and in response thereto generates a feedback signal for adjusting the output voltage of the DC/DC converter.

Generally, in still another aspect of the invention, a driver supplies a current to a plurality of light sources. The driver includes: a DC/DC converter and a control device. The DC/DC converter is configured to receive a first DC voltage and to output an output voltage. The output voltage causes a current to flow through the light sources. A control device is configured to control the current flowing through a portion of the light sources in response to a control signal. The control signal is produced by the DC/DC converter.

In many embodiments, the control device includes a pulse width modulator that controls the current flowing through the portion of the light sources by shunting the current across one or more of the light sources in response to the control signal. In one embodiment, the DC/DC converter includes a flyback converter. The control signal is produced by a winding of a transformer in the flyback converter. In another embodiment, the DC/DC converter includes a buck converter. The control signal is produced by an inductor winding in the buck converter.

The driver may include a feedback device configured to sample the current and in response thereto to control a switching operation of the DC/DC converter.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. In particular, the term LED refers to light emitting diodes of all types (including semi-conductor and organic light emitting diodes) that may be configured to generate radiation in one or more of the infrared spectrum, ultra-violet spectrum, and various portions of the visible spectrum (generally including radiation wavelengths from approximately 400 nanometers to approximately 700 nanometers). Some examples of LEDs include, but are not limited to, various types of infrared LEDs, ultraviolet LEDs, red LEDs, blue LEDs, green LEDs, yellow LEDs, amber LEDs, orange LEDs, and white LEDs (discussed further below). It also should be appreciated that LEDs may be configured and/or controlled to generate radiation having various bandwidths (e.g., full widths at half maximum, or FWHM) for a given spectrum (e.g., narrow bandwidth, broad bandwidth), and a variety of dominant wavelengths within a given general color categorization.

For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum.

It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs). In general, the term LED may refer to packaged LEDs, non-packaged LEDs, surface mount LEDs, chip-on-board LEDs, T-package mount LEDs, radial package LEDs, power package LEDs, LEDs including some type of encasement and/or optical element (e.g., a diffusing lens), etc.

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, other types of electroluminescent sources, pyro-luminescent sources (e.g., flames), candle-luminescent sources (e.g., gas mantles, carbon arc radiation sources), photo-luminescent sources (e.g., gaseous discharge sources), cathode luminescent sources using electronic satiation, galvano-luminescent sources, crystallo-luminescent sources, kine-luminescent sources, thermo-luminescent sources, triboluminescent sources, sonoluminescent sources, radioluminescent sources, and luminescent polymers.

A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

For purposes of this disclosure, the term "color" is used interchangeably with the term "spectrum." However, the term "color" generally is used to refer primarily to a property of radiation that is perceivable by an observer (although this usage is not intended to limit the scope of this term). Accordingly, the terms "different colors" implicitly refer to multiple spectra having different wavelength components and/or bandwidths. It also should be appreciated that the term "color" may be used in connection with both white and non-white light. The term "color temperature" generally is used herein in connection with white light, although this usage is not intended to limit the scope of this term. Color temperature essentially refers to a particular color content or shade (e.g., reddish, bluish) of white light. The color temperature of a given radiation sample conventionally is characterized according to the temperature in degrees Kelvin (K) of a black body radiator that radiates essentially the same spectrum as the radiation sample in question. Black body radiator color temperatures generally fall within a range of from approximately 700 degrees K (typically considered the first visible to the human eye) to over 10,000 degrees K; white light generally is perceived at color temperatures above 1500-2000 degrees K. Lower color temperatures generally indicate white light having a more significant red component or a "warmer feel," while higher color temperatures generally indicate white light having a more significant blue component or a "cooler feel." By way of example, fire has a color temperature of approximately 1,800 degrees K, a conventional incandescent bulb has a color temperature of approximately 2848 degrees K, early morning daylight has a color temperature of approximately 3,000 degrees K, and overcast midday skies have a color temperature of approximately 10,000 degrees K. A color image viewed under white light having a color temperature of approximately 3,000 degree K has a relatively reddish tone, whereas the same color image viewed under white light having a color temperature of approximately 10,000 degrees K has a relatively bluish tone.

The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION

Applicants have recognized and appreciated that it would be beneficial to allow for the independent and efficient adjustment of current through one channel of a two channel LED driver while keeping the current in the un-adjusted channel constant. In view of the foregoing, various embodiments and implementations of the present invention are directed to providing a DC/DC converter with a control arrangement for controlling the current supplied to at least one of the two channels in response to a control signal produced by the DC/DC converter.

Figure 1:
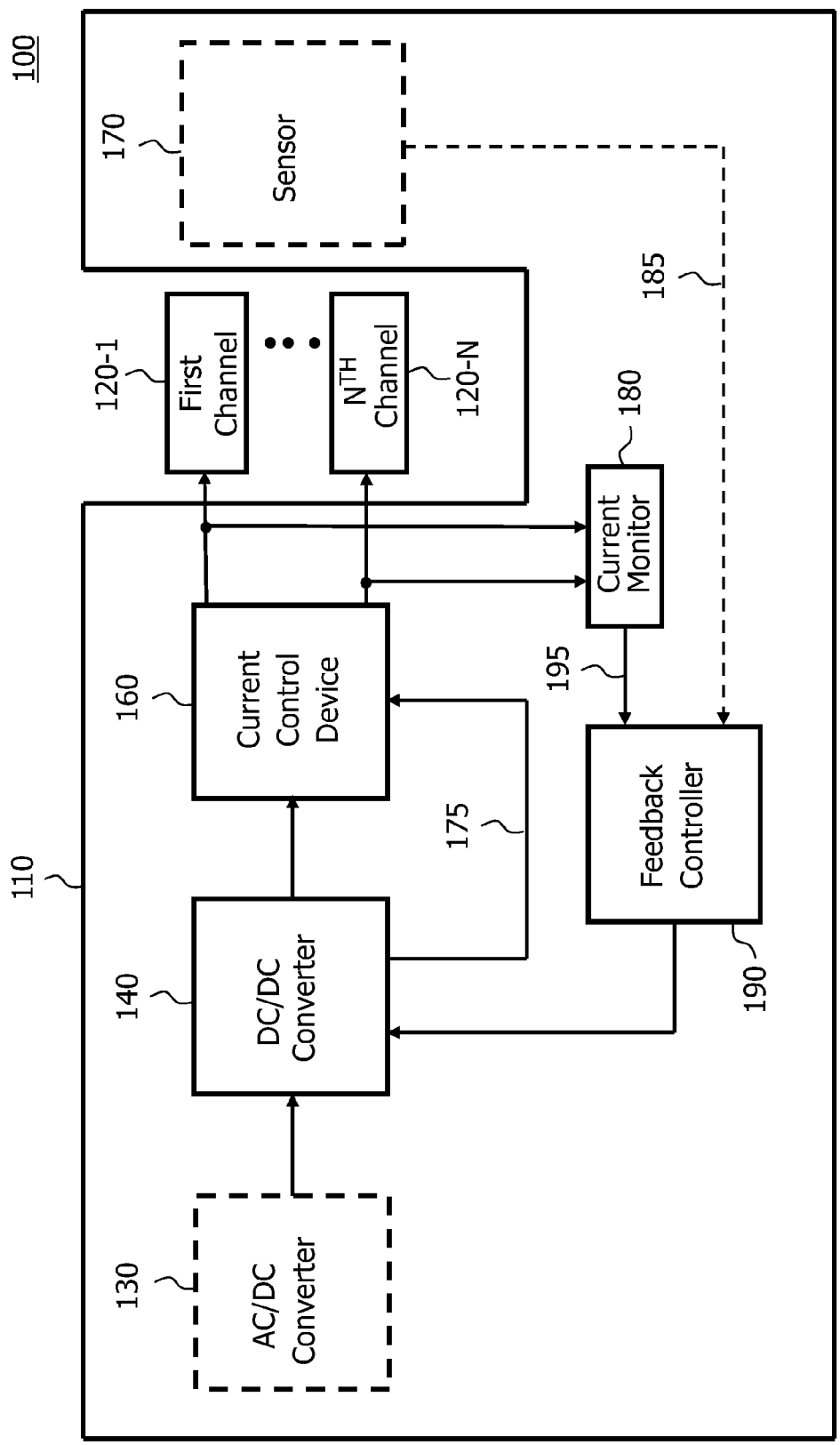
FIG. 1 shows a functional block diagram of a lighting unit, according to various embodiment of the invention.

FIG. 1 illustrates a functional block diagram of a lighting unit 100. Lighting unit 100 includes a driver 110 and first through $N^{th}$ channels of light sources 120-1 through 120-N, for example, light emitting diodes (LEDs). In one exemplary arrangement, the light sources in first through $N^{th}$ channels of light sources 120-1 through 120-N are light emitting diodes (LEDs).

Also, at least one of the light sources in each channel has a different color or color temperature than at least one of the light sources in each of the other channels. In some embodiments, all of the light sources in each channel have a different color or color temperature than all of the light sources in each of the other channels. In an example embodiment, there may be two channels and the first channel may include "white" light sources (e.g., LEDs) and the second channel may include non-white "colored" (e.g., red) light sources (e.g., LEDs). Many such example embodiments are possible. In one embodimentt, N=2 and the first and second channels of light sources 120-1 and 120-2 are connected in series with each other.

Driver 110 includes AC/DC converter 130, DC/DC converter 140, current control device 160, a sensor 170, a current monitor 180, and a feedback controller 190. In some embodiments, the driver may be supplied with a DC voltage (for example, form an external AC/DC converter), in which case AC/DC converter 130 may be omitted. In some embodiments in particular, sensor 170 may be omitted.

In embodiments where it is included, AC/DC converter 130 converts an AC voltage such as 120 VAC to a DC voltage and may include an input filter and a voltage rectifier.

DC/DC converter 140 converts a DC voltage (e.g., output by AC/DC converter 130) to a desired voltage level for driving first through $N^{th}$ channels of light sources 120-1 through 120-N. Beneficially, DC/DC converter may include two stages comprising: a flyback converter as a first stage or front end, which converts a first DC voltage to a second DC; and a "Buck" converter as a second stage or back end converting the second DC voltage to an output DC voltage.

Current control device 160 supplies and controls current from the output of DC/DC converter 140 to first through $N^{th}$ channels of light sources 120-1 through 120-N. In particular, current control device 160 receives a current control signal 175 derived from DC/DC converter 140 and in response thereto controls the current through one or more of the first through $N^{th}$ channels of light sources 120-1 through 120-N. In a beneficial arrangement, current control device includes a pulse width modulator (PWM) type switch is provided across a selection of the light sources as necessary to achieve a desired lighting effect for lighting unit 100.

In embodiments where it is included, sensor 170 senses heat or light generated by first through $N^{th}$ channels of light sources 120-1 through 120-N and provides a feedback signal 185 to feedback controller 190 for adjusting DC voltage output by DC/DC converter 140 to maintain a desired lighting effect by lighting unit 100 as components age, environmental conditions change, etc.

Current monitor 180 monitors or samples the current through first through $N^{th}$ channels of light sources 120-1 through 120-N and provides a current sample signal 195 to feedback controller 190.

Feedback controller 190 receives the current sample signal from current monitor 180 and in response thereto provides one or more control signals to DC/DC converter 140 for adjusting the output voltage of DC/DC converter 140. Beneficially, the feedback loop with feedback controller 190 current, maintains the current through first through $N^{th}$ channels of light sources 120-1 through 120-N, and hence the light level of lighting unit 100, constant with any change in the input voltage or load.

In lighting unit 100, a number of variables are available to achieve a desired lighting effect: the choice of light source, (i.e., the number and color temperatures of the light sources in first through $N^{th}$ channels of light sources 120-1 through 120-N); the selection and number of light sources controlled by current control device 160; internal and output voltages of DC/DC converter 140; and the mechanism for producing the control signal 175 in DC/DC converter 140 all provide means that can be adjusted or determined to provide the necessary drive current for first through $N^{th}$ channels of light sources 120-1 through 120-N. Once determined and designed, then the lighting affect achieved by lighting unit 100 can be altered or fine-tuned by changing or adjusting an internal voltage and/or output voltage of DC/DC converter 140. The voltage (s) can be fixed at the factory pending the utilization of a particular batch or bin of light sources (e.g., LEDs), or may be adjusted by means of a feedback loop with sensor 170 to maintain the desired lighting effect with variations in environmental and aging conditions, or may be adjusted by the user.

Further explanation of lighting unit 100 will now be provided with reference to specific exemplary embodiments.

Figure 2:
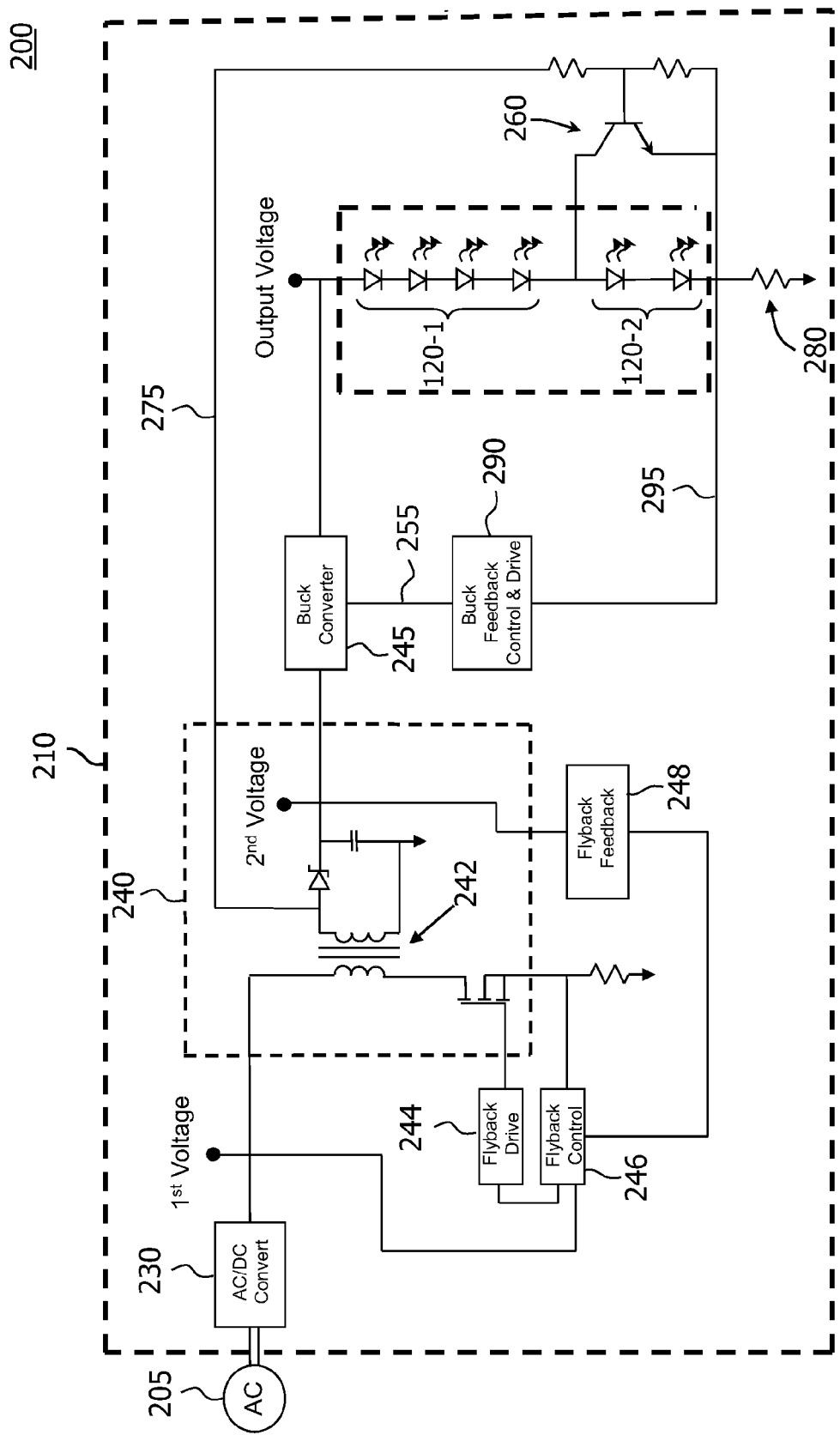
FIG. 2 illustrates a first embodiment of a lighting unit.

FIG. 2 illustrates a first embodiment of a lighting unit 200. Lighting unit 200 includes a driver 210 and first and second channels of light sources 120-1 and 120-2.

In lighting unit 200, first and second channels of light sources 120-1 and 120-2 are connected in series with each other. As discussed above with respect to FIG. 1, in one embodiment the light sources are LEDs. Also beneficially, at least one of the light sources in each channel has a different color or color temperature than at least one of the light sources in each of the other channels. In some embodiments, all of the light sources in each channel have a different color or color temperature than all of the light sources in each of the other channels. In an example embodiment, the light sources in the first channel 120-1 are "white" light sources (e.g., white LEDs) and the light sources in the second channel 120-2 are non-white "colored" (e.g., red) light sources (e.g., red LEDs). Many such example embodiments are possible.

Driver 210 includes an AC/DC converter 230, a flyback converter 240, a flyback drive unit 244, a flyback control unit 246, a flyback feedback unit 248, a buck converter 245, a pulse width modulator (PWM) switch 260, a current sampling resistor 280, and a buck converter feedback control and drive unit 290.

AC/DC converter 230 receives an input AC voltage from AC input 205 and converts the AC voltage to a first DC voltage. AC/DC converter 230 may include an input filter and rectifier.

Flyback converter 240 includes a flyback transformer 242, a switching device, a diode, and a capacitor. Flyback converter 240 comprises a first stage or front end of the DC/DC converter of driver 210. Flyback converter 240 receives a first DC voltage from AC/DC converter 230 and outputs a second DC voltage which may be adjusted by proper selection of turn ratios in flyback transformer 242 and the feedback and switching control operations of flyback drive unit 244, flyback control unit 246, and flyback feedback unit 248. In some embodiments, flyback converter 240 may provide active power factor correction to the input line current, i.e., the load seen by the AC input 205. In some embodiments, flyback converter 240 may also provide safety isolation between AC input 205 and the user or light sources in channels 120-1 and 120-2. Otherwise, the configuration and operation of flyback converters are well known and will not be repeated here.

Buck converter 245 comprises a second stage or back end of the DC/DC converter of driver 210. Buck converter 245 receives the second DC voltage from flyback converter 240 and produces an output voltage that causes a current to flow through first and second channels of light sources 120-1 and 120-2.

Figure 3:
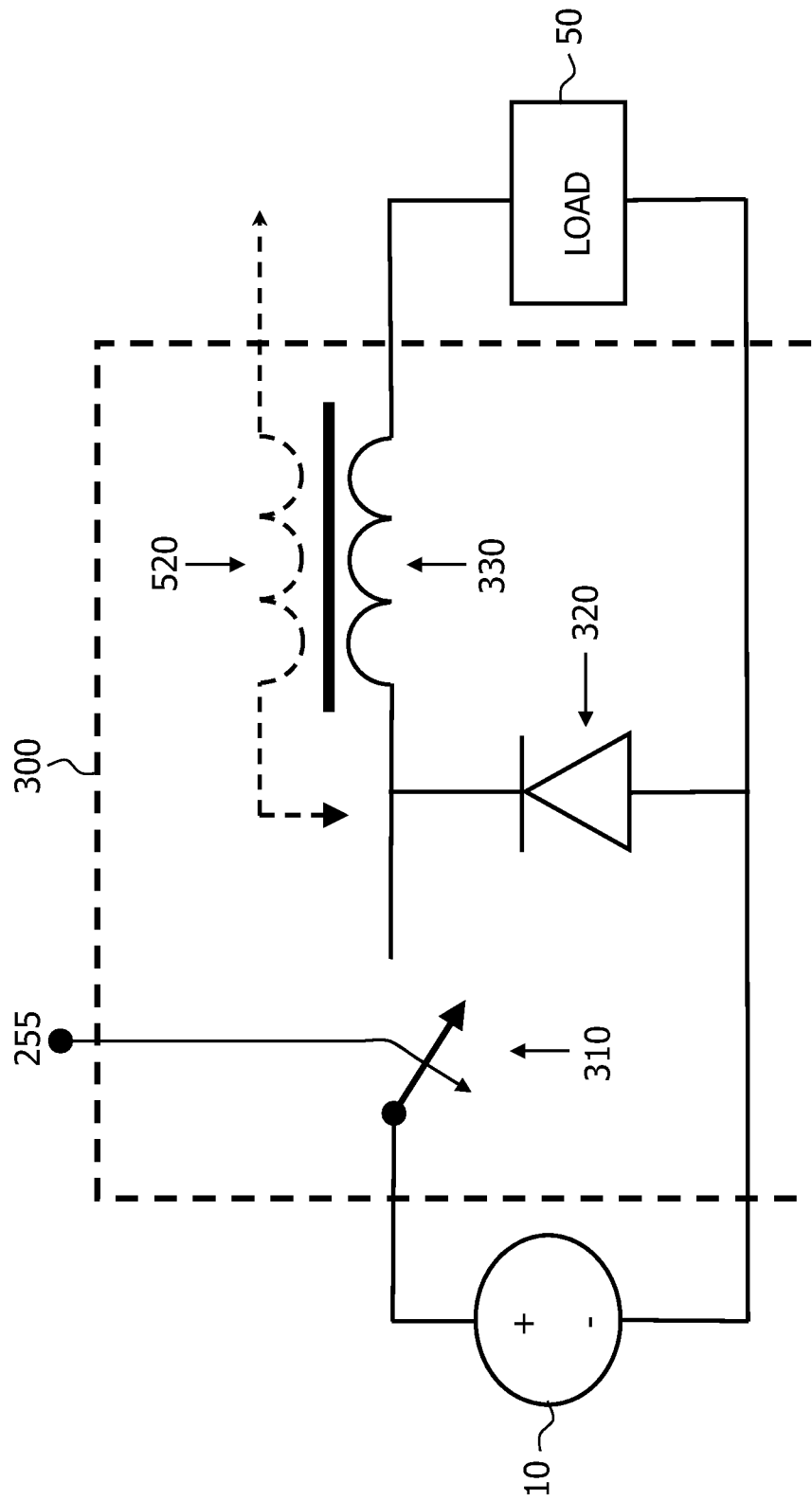
FIG. 3 illustrates one embodiment of a buck converter.

FIG. 3 is a function diagram of one embodiment of a buck converter 300 which may be employed in lighting unit 200. Buck converter 300 includes a switching device 310 (e.g., a transistor such as a switching field effect transistor (FET)), a diode 320, an inductor 330, and optionally a second inductor 520 which is inductively coupled to inductor 330. The duty cycle of switching device 310 is controlled by a buck converter control signal 255 which is produced by buck converter feedback control and drive unit 290, as will be explained in greater detail below. An explanation of optional second inductor 520 will be provided below with respect to FIG. 5. Otherwise, configuration and operation of buck converters are well known and will not be repeated here.

Current sampling resistor 280 samples the total current through the first channel of light sources 120-1 and provides a current sampling signal to buck converter feedback control and drive unit 290. In response to the current sampling signal, buck converter feedback control and drive unit 290 generates buck converter control signal 255 which, for example, controls the duty cycle of switching device 310 in buck converter 245. This in turn controls the current through the first channel of light sources 120-1. For example, feedback control and drive unit 290 may include an operational amplifier or comparator which compares the current sampling signal to a desired value and in response thereto adjusts the buck converter control signal 255. In some embodiments, the current sampling resistor may be connected "on the high side" between the output voltage of buck converter 245 and the light sources, rather than between the light sources and the return voltage (e.g., ground). In some embodiments, other current sampling arrangements may be provided instead of the series current sampling resistor 280.

Nominally, the duty cycle of buck regulator 245 will set the ratio of the output voltage divided by the second DC voltage. In a beneficial arrangement, the control loop including sampling resistor 280, buck converter feedback control and drive unit 290, and buck converter 245 keeps the overall current though the first channel of light sources 120-1 constant with any change in the first DC voltage or load. Beneficially, this arrangement can provide for a regulated current through the light sources over a relatively wide range of first DC voltages.

In lighting unit 200, PWM switch 260 is a bipolar transistor, but in some embodiments, a different switching device may be employed. PWM switch 260 is connected across the light sources of the second channel of light sources 120-2 so as to periodically shunt or bypass the current that would otherwise flow through the second channel of light sources 120-2 in response to the control signal 275. By varying the duty cycle of PWM switch 260, the average current flowing through the second channel of light sources 120-2 is adjusted. This in turn adjusts the average light produced by the second channel of light sources 120-2, which results in an adjustment of the overall intensity and color of the light produced by lighting unit 200. In some embodiments the PWM switch may be connected on the "high side" of the series arrangement, across the first channel of light sources 120-1 instead of the second channel of light sources 120-2. In general, PWM switch 260 may be connected across any selection of the light sources as necessary to achieve a desired lighting effect.

In one particular arrangement, in lighting unit 200 the secondary winding of flyback transformer 242 is employed to provide control signal 275 for controlling PWM switch 260. To achieve a desired lighting effect, a number of variables or parameters of lighting unit 200 can be adjusted. The choice of light sources (e.g., the number and color temperatures of the "White" light sources (e.g., LEDs) of first channel 120-1, and the light sources of second channel 120-2 having a different color or color temperature); the placement of PWM switch 260; the second DC voltage level; and the turns ratio of flyback transformer 242 all provide a means that can be adjusted or determined to provide the control signal for PWM switch 260. Once determined and designed, then the lighting affect can be altered or fine-tuned by changing or adjusting the second DC voltage level. The second DC voltage level may be fixed at the factory pending the utilization of a particular batch or bin of light sources (e.g., LEDs)

Although not shown in FIG. 2, the second DC voltage level may be adjusted by means of a feedback loop with a thermal and/or light sensor (e.g., sensor 170 of FIG. 1) to maintain the desired lighting effect with variations in environmental and aging conditions, or it may be adjusted by the user. This feedback adjustment may occur on either the primary or secondary (isolated) side of flyback transformer 242.

Figure 4:
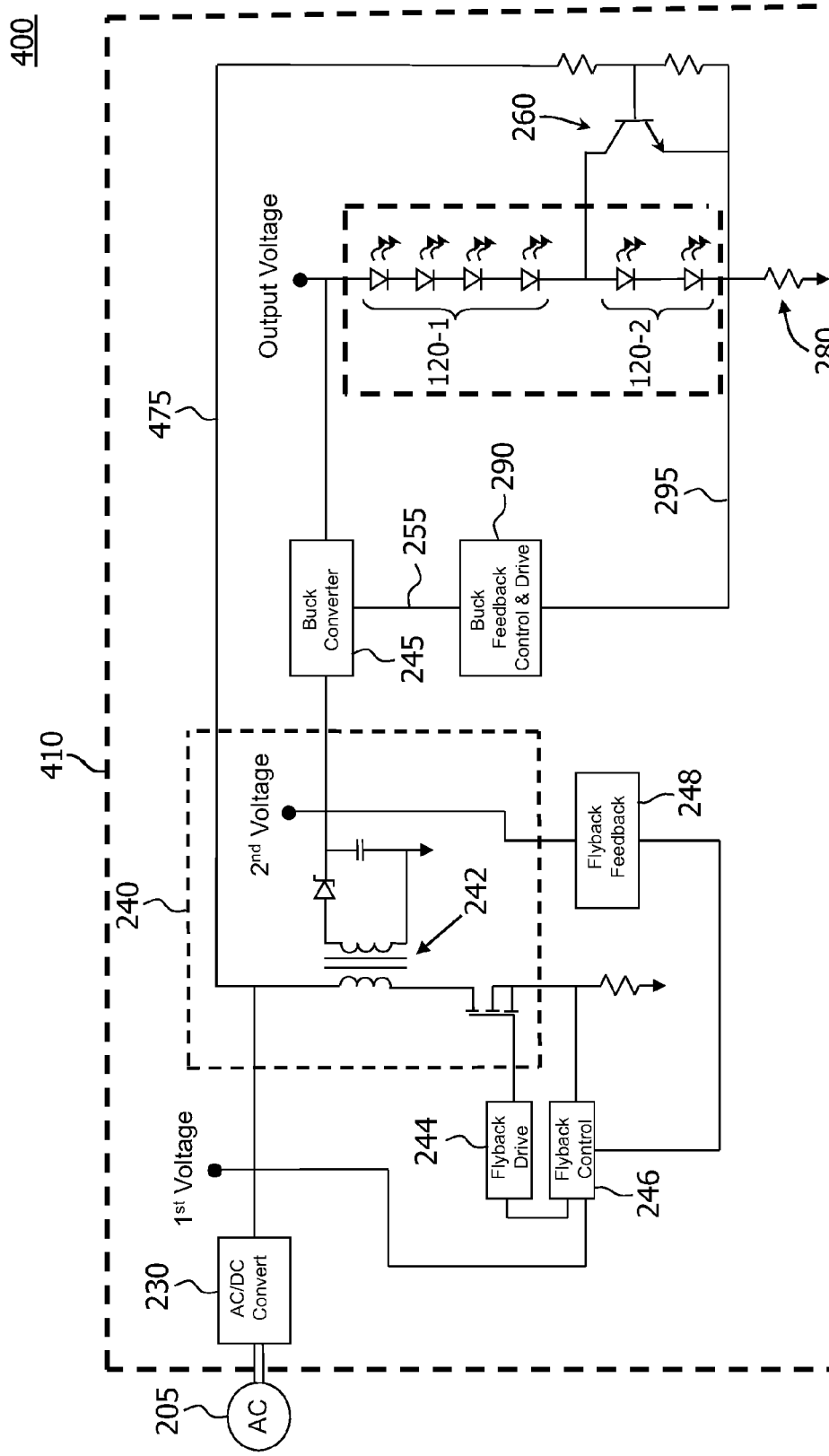
FIG. 4 illustrates a second embodiment of a lighting unit.

FIG. 4 illustrates a second embodiment of a lighting unit 400 including driver 410. Lighting unit 400 is identical to lighting unit 200, except that PWM switch 260 in lighting unit 400 is controlled by control signal 475 which is produced from the primary winding of flyback transformer 242.

Figure 5:
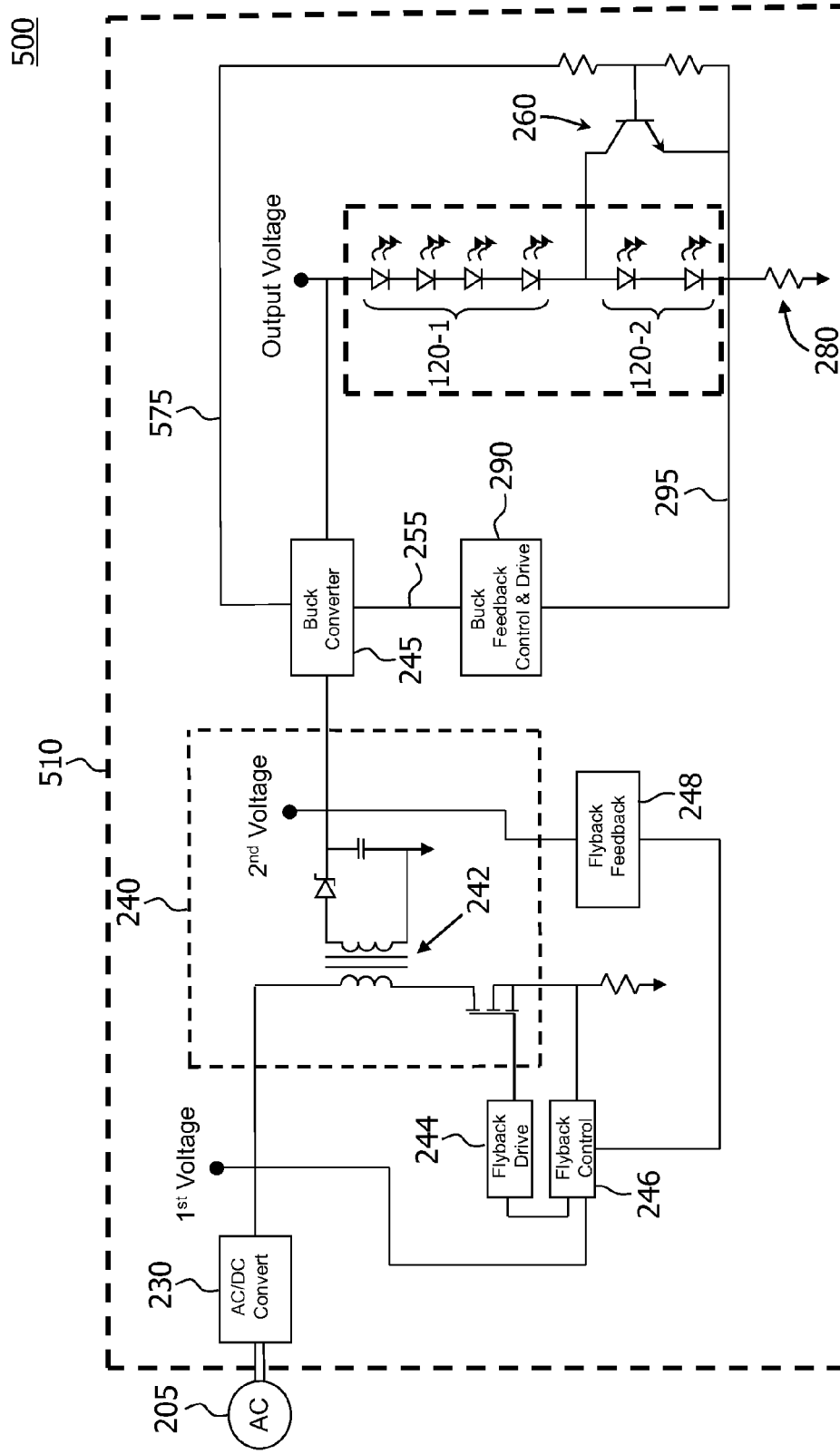
FIG. 5 illustrates a third embodiment of a lighting unit.

FIG. 5 illustrates a third embodiment of a lighting unit 500 including driver 510. Lighting unit 500 is identical to lighting unit 200, except that PWM switch 260 in lighting unit 500 is controlled by control signal 575 which is produced from a winding of buck converter 245, for example, the winding 520 as shown in FIG. 3.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

Any reference numerals or other characters, appearing between parentheses in the claims, are provided merely for convenience and are not intended to limit the claims in any way.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

What is claimed is:

1. An apparatus, comprising:
    a first channel of first light emitting devices (LEDs) connected in series with each other;
    a second channel of second LEDs connected in series with each other, at least one of the second LEDs having at least one of a different color and a different color temperature than at least one of the first LEDs; and
    a driver for driving the first and second channels of LEDs, the driver including:
        a flyback converter configured to receive a first DC voltage and to output a second DC voltage,
        a buck converter configured to receive the second DC voltage and to generate an output voltage that causes a first current to flow through the first channel of LEDs and a second current to flow through the second channel of LEDs,
        a pulse width modulator configured to control the second current flowing through to the second channel of LEDs in response to a control signal, wherein the control signal for controlling the second current flowing through the second channel of LEDs is produced from an inductor winding in one of the flyback converter and the buck converter, and
        a feedback device configured to sample at least one of the first current and the second current and in response thereto to control a switching operation of the buck converter.

2. The apparatus of claim 1, wherein the inductor winding from which the control signal is generated is a primary winding of a transformer in the flyback converter.

3. The apparatus of claim 1, wherein the inductor winding from which the control signal is generated is a secondary winding of a transformer in the flyback converter.

4. The apparatus of claim 1, wherein the inductor winding from which the control signal is generated is an inductor winding of the buck converter.

5. The apparatus of claim 1, wherein at least one of the first LEDs emits a white light, and wherein at least one of the second LEDs emits a non-white colored light.

6. The apparatus of claim 1, wherein the first channel of first LEDs is connected in series with the second channel of second LEDs.

7. The apparatus of claim 1, further comprising a temperature sensor configured to sense a temperature of at least one of the first and second LEDs, and in response thereto to generate a feedback signal for adjusting the output voltage.

8. The apparatus of claim 1, further comprising a light sensor configured to sense light produced by the first and second LEDs, and, in response thereto, to generate a feedback signal for adjusting the output voltage.

9. An apparatus, comprising:
    a first group of light sources connected in series with each other;
    a second group of light sources connected in series with each other, at least one of the light sources of the second group having at least one of a different color and a different color temperature than at least one of the light sources of the first group;
    a driver for driving the first and second groups of light sources, the driver including:
        a DC/DC converter configured to receive a first DC voltage and to output an output voltage, the output voltage causing a first current to flow through the first group of light sources and a second current to flow through the second group of light sources; and
        a control device configured to control the second current flowing through to the second group of light sources in response to a control signal,
    wherein the control signal for controlling the second current flowing through the second group of light sources is produced by the DC/DC converter.

10. The apparatus of claim 9, wherein the control device comprises a pulse width modulator that controls the second current flowing through the second group of light sources by shunting the second current across one or more of the second light sources in response to the control signal.

11. The apparatus of claim 9, wherein the second group of light sources have one of a different color and a different color temperature than the first group of light sources.

12. The apparatus of claim 9, wherein the DC/DC converter includes a flyback converter, and wherein the control signal for controlling the second current flowing through the second group of light sources is produced by a winding of a transformer in the flyback converter.

13. The apparatus of claim 9, wherein the DC/DC converter includes a buck converter, and wherein the control signal for controlling the second current flowing through the second group of light sources is produced by an inductor winding in the buck converter.

14. The apparatus of claim 9, wherein the driver further comprises a feedback device configured to sample at least one of the first current and the second current and in response thereto to control a switching operation of the DC/DC converter.

15. The apparatus of claim 9, wherein the driver further comprises a sensor configured to sense one of a temperature and light emitted by at least one of the first and second light sources, and in response thereto to generate a feedback signal for adjusting the output voltage of the DC/DC converter.

16. A driver for supplying current to a plurality of light sources, the driver including:
    a DC/DC converter configured to receive a first DC voltage and to output an output voltage, the output voltage causing a current to flow through the light sources; and
    a control device configured to control the current flowing through a portion of the light sources in response to a control signal, wherein the control signal for controlling the current flowing through the portion of the light sources is produced by the DC/DC converter.

17. The driver of claim 16, wherein the control device comprises a pulse width modulator that controls the current flowing through the portion of the light sources by shunting the current across one or more of the light sources in response to the control signal.

18. The driver of claim 16, wherein the DC/DC converter includes a flyback converter and wherein the control signal is produced by a winding of a transformer in the flyback converter.

19. The driver of claim 16, wherein the DC/DC converter) includes a buck converter, and wherein the control signal is produced by an inductor winding in the buck converter.

20. The driver of claim 16, further comprising a feedback device configured to sample the current and in response thereto to control a switching operation of the DC/DC converter.

* * * * *